United States Patent
Lee et al.

(10) Patent No.: US 10,627,822 B2
(45) Date of Patent: Apr. 21, 2020

(54) MOVING ROBOT AND CONTROL METHOD THEREOF

(71) Applicant: LG ELECTRONICS INC., Seoul (KR)

(72) Inventors: Jaehoon Lee, Seoul (KR); Jongil Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 15/493,335

(22) Filed: Apr. 21, 2017

(65) Prior Publication Data
US 2017/0315554 A1    Nov. 2, 2017

(30) Foreign Application Priority Data
Apr. 29, 2016  (KR) .................. 10-2016-0053255

(51) Int. Cl.
G05D 1/02    (2020.01)
A01D 34/00    (2006.01)
G01C 17/38    (2006.01)
G01C 25/00    (2006.01)

(52) U.S. Cl.
CPC ......... G05D 1/0219 (2013.01); A01D 34/008 (2013.01); G01C 17/38 (2013.01); G01C 25/005 (2013.01); G05D 1/027 (2013.01); G05D 1/0259 (2013.01); G05D 1/0265 (2013.01); G05D 2201/0208 (2013.01)

(58) Field of Classification Search
CPC ....................................................... G05D 1/02
See application file for complete search history.

(56) References Cited

U.S. PATENT DOCUMENTS

| 2008/0120054 | A1 | 5/2008 | Parks et al. |
| 2009/0281739 | A1* | 11/2009 | Ikkink .................. G01C 17/00 702/57 |
| 2012/0083961 | A1* | 4/2012 | Sato ..................... G05D 1/0259 701/25 |
| 2012/0290165 | A1* | 11/2012 | Ouyang ............... G05D 1/0255 701/25 |

(Continued)

FOREIGN PATENT DOCUMENTS

| EP | 2 990 903 | 3/2016 |
| EP | 3 073 345 | 9/2016 |

(Continued)

OTHER PUBLICATIONS

Korean Notice of Allowance issued in Application 10-2016-0053255 dated Feb. 9, 2018.

(Continued)

*Primary Examiner* — Kira Nguyen
(74) *Attorney, Agent, or Firm* — KED & Associates LLP

(57) ABSTRACT

A lawn mowing robot for performing self-driving is provided. The lawn mowing robot includes a body forming an appearance of the lawn mowing robot, a driving wheel configured to move the body, a sensor configured to sense information associated with a posture of the lawn mowing robot, and a controller configured to perform a calibration of the sensor to control the driving wheel to move the body in a predetermined pattern in an operating area of the lawn mowing robot, for setting a parameter associated with the sensor.

27 Claims, 7 Drawing Sheets

(56) References Cited

U.S. PATENT DOCUMENTS

2016/0297289 A1* 10/2016 Ito .................. B60K 17/043
2016/0377688 A1* 12/2016 Kleiner ............ G01R 33/0035
                    324/202

FOREIGN PATENT DOCUMENTS

| | | |
|---|---|---|
| JP | H 09-325029 | 12/1997 |
| JP | H 11-14353 | 1/1999 |
| JP | 2012-079023 | 4/2012 |
| KR | 2015-0125508 | 11/2015 |

OTHER PUBLICATIONS

Korean Office Action dated Jul. 17, 2017 issued in Application No. 10-2016-0053255.
European Search Report dated Sep. 1, 2017 issued in Application No. 17168972.2.

* cited by examiner

MOVING ROBOT AND CONTROL METHOD THEREOF

CROSS-REFERENCE TO RELATED APPLICATION(S)

Pursuant to 35 U.S.C. § 119(a), this application claims the benefit of earlier filing date and right of priority to Korean Application No. 10-2016-0053255, filed on Apr. 29, 2016, the contents of which is incorporated by reference herein in its entirety.

BACKGROUND

1. Field

The present disclosure relates to a moving robot and a control method thereof, and particularly, to a moving robot and a control method thereof, which mow lawn.

2. Background

Lawn mowers are devices for trimming lawn which are planted on yards of homes, playgrounds, and/or the like. The lawn mowers are categorized into lawn mowers for homes used in homes and lawn mowers for tractors used in wide playgrounds or wide farms.

The lawn mowers for homes are divided into a walk behind type, where a user mows lawn while dragging a lawn mower behind, and a hand type where a user directly carries a lawn mower by hand.

However, in two types of lawn mowers, there is a difficulty in that a user should directly operate a lawn mower.

Particularly, since it is difficult for a user to directly operate a lawn mower to mow lawn on a playground in busy daily life, a laborer for mowing lawn is mainly used, and for this reason, the employment cost is expended.

Therefore, a self-driving lawn mower for preventing the additional cost and reducing inconvenience of a user is being developed. Various researches for controlling the moving performance of a lawn mowing robot.

In comparison with a working area of a moving robot, a working area of the lawn mowing robot has a different feature. In the working area, the work efficiency of the lawn mowing robot including a driving algorithm of a general moving robot is considerably reduced.

In detail, in a case where a lawn mowing robot is driving in a critical region such as an inclined plane, the lawn mowing robot can be slipped down through the inclined plane without driving in a desired direction. When the lawn mowing robot is slipped in the middle of driving, it is difficult to detect a position of the lawn mowing robot or move the robot through a predetermined route.

Various kinds of sensors are installed in a lawn mowing robot. The sensors are manufactured, and then, a user finally performs a calibration operation on the manufactured sensors, thereby setting a plurality of parameter values associated with the manufactured sensors. The user may additionally perform the calibration to adjust the parameter values.

A sensor, which is the same as a sensor installed in a moving robot which operates in indoors, is installed in a related art lawn mowing robot. That is, calibration which is the same as calibration applied to the moving robot which operates in indoors is applied to the sensor installed in the lawn mowing robot.

When the related art lawn mowing robot with the sensor installed therein is operating in an operating area, information sensed by the sensor installed in the lawn mowing robot may include a relatively large error.

That is, in a case where an indoor moving robot and a lawn mowing robot includes sensors to which the same calibration operation is applied, since an operating area of the lawn mowing robot differs from an indoor environment, the related art lawn mowing robot senses information which is large in error, or performs an operation algorithm based on the information which is large in error, causing a problem where the lawn mowing robot operates differently from an intention of a user.

BRIEF DESCRIPTION OF THE DRAWINGS

Embodiments will be described in detail with reference to the following drawings in which like reference numerals refer to like elements and wherein.

The accompanying drawings, which are included to provide a further understanding of the disclosure and are incorporated in and constitute a part of this specification, illustrate exemplary embodiments and together with the description serve to explain the principles of the disclosure.

DETAILED DESCRIPTION

Hereinafter, an embodiment where a moving robot 100 according to the present invention drives in an operating area 1000 will be described with reference to FIG. 1.

For reference, the below-described moving robot 100 may perform self-driving in the operating area 1000 where lawn is planted, and may mow lawn existing in the operating area 1000 in the middle of performing the self-driving. Therefore, the moving robot 100 described herein may substantially be a lawn mowing robot.

However, the moving robot 100 according to the present invention is not limited to the purpose of mowing lawn, and the moving robot 100 according to the present invention may be various kinds of robots which drive at an outdoor place.

Figure 1:
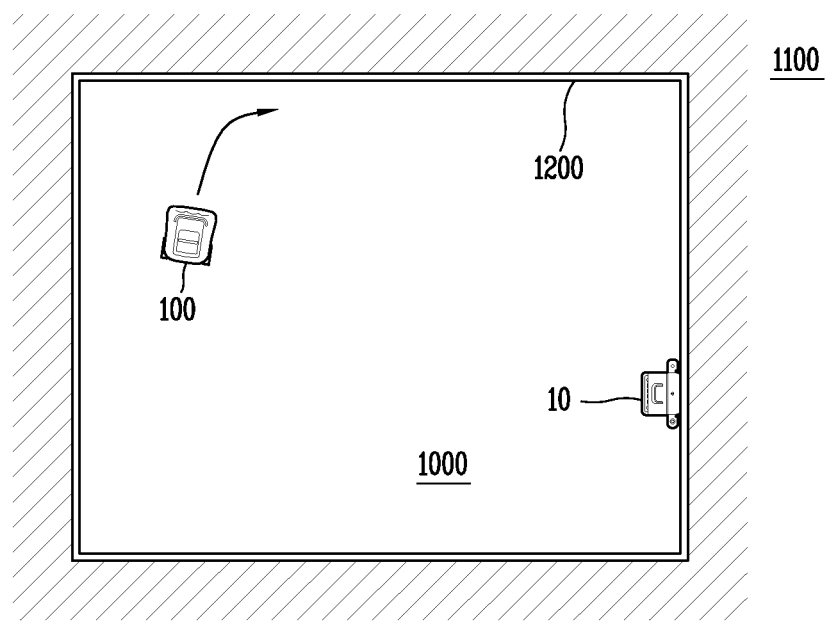
FIG. 1 is a conceptual diagram illustrating an embodiment of a moving robot or a lawn mowing robot for mowing lawn according to the present invention and an operating area of a corresponding robot.

Referring to FIG. 1, the moving robot 100 may autonomously drive in a certain area. Also, the moving robot 100 may perform a specific function in the middle of driving.

In more detail, the moving robot 100 may be a lawn mowing robot. In this case, the specific function may be a function of mowing lawn in the operating area 1000.

Moreover, the operating area 1000 may be defined by a boundary wire 1200 provided a closed curve. In detail, the boundary wire 1200 may be installed in an arbitrary area, and the moving robot 100 may move in an area defined by the closed curve formed by the boundary wire 1200.

The boundary wire 1200 may be installed in the operating area. In more detail, the boundary wire 1200 may be installed on a boundary line between the operating area 1000 of the moving robot 100 and an external area 1100, or may be installed in the operating area 1000 to be spaced apart from by a certain interval.

In this case, a value of the certain interval where the boundary wire 1200 is installed may be changed. Therefore, a user may install the boundary wire 1200 along an outer portion of the operating area 1000, and since it is not required to consider an interval at which the boundary wire 1200 is installed from the outer portion or the external area 1100, the boundary wire 1200 can be more easily installed.

As illustrated in FIG. 1, a charging device 10 of the moving robot 100 may be installed to be connected to the boundary wire 1200. Although not shown, the charging device 10 may be installed in a partial region of the operating area 1000 including an area where the boundary wire 1200 is installed. Also, although not shown in FIG. 1, the charging device 10 may be installed in a partial region of the operating area 1000 and a partial region of the external area 1100.

The operating area 1000 which is an area where the moving robot 100 drives may be provided as a critical region unlike an indoor environment. That is, lawn may be planted in the operating area 1000, and moreover, the operating area 1000 may include various inclined planes, and a floor of the operating area 1000 may be formed of various materials.

Although not shown in FIG. 1, the operating area 1000 may be divided or defined by a boundary generation device (not shown). The boundary generation device may be installed at one point of the operating area 1000, may generate information associated with a boundary of the operating area 1000, and may transmit the generated information associated with the operating area 1000 to the moving robot 100.

Moreover, the boundary generation device may receive the information associated with the boundary of the operating area 1000 from the moving robot 100 and may change the information associated with the boundary of the operating area 1000, based on the information received from the moving robot 100.

For example, the moving robot 100 and the boundary generation device may transmit or receive the information associated with the boundary of the operating area 1000 by using at least one wireless communication of Wi-Fi, Wibro, Bluetooth, Zigbee, and ANT.

Hereinafter, an embodiment of the moving robot 100 according to the present invention will be described with reference to FIG. 2.

Figure 2:
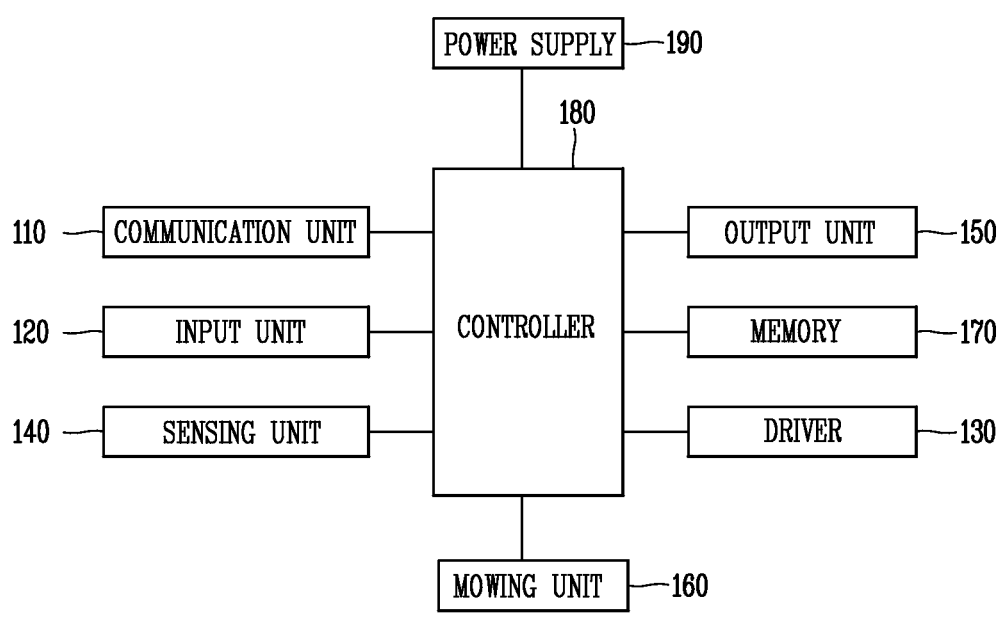
FIG. 2 is a block diagram illustrating elements of a moving robot or a lawn mowing robot for mowing lawn according to an embodiment of the present invention.

As illustrated in FIG. 2, the moving robot 100 may include at least one of a communication unit 110, an input unit 120, a driver 130, a sensing unit 140, an output unit 150, a mowing unit 160, a memory 170, a controller 180, and a power supply 190. The elements illustrated in FIG. 2 are not essential in implementing the moving robot, and thus, the moving robot described herein may have more or fewer elements than the above-listed elements.

In more detail, the communication unit 110 among the elements may include one or more modules which enable wireless communication between the moving robot 100 and a wireless communication system, between the moving robot 100 and another moving robot, between the moving robot 100 and a mobile terminal (not shown), between the moving robot 100 and a communication unit (not shown) of the charging device 10, or between the moving robot 100 and an external server. Also, the communication unit 110 may include one or more modules connecting the moving robot 100 to one or more networks.

The communication unit 110 may include at least one of a mobile communication module, a wireless Internet module, a near field communication (NFC) module, and a position information module.

The input unit 120 may include a camera or an image input unit for inputting an image signal, a microphone or an audio input unit for inputting an audio signal, and a user input unit (for example, a touch key, a mechanical key, etc.) for receiving information from a user. Voice data or image data collected by the input unit 120 may be analyzed and may be processed as a control command of the user.

The sensing unit 140 may include one or more sensors for sensing at least one of internal information of a mobile terminal, ambient environment information surrounding the mobile terminal, and user information. For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared sensor, a finger scan sensor, an ultrasonic sensor, an optical sensor (for example, a camera), a microphone, a battery gauge, an environment sensor (for example, a barometer, a hygrometer, a thermometer, a radiation sensor, a heat sensor, a gas sensor, etc.), and a chemical sensor (for example, an electronic nose, a healthcare sensor, a bio recognition sensor, etc.).

The sensing unit 140 may include at least two coils which are differently installed, and the two coils may each sense a voltage value in the same area divided with respect to the wire 1200. That is, the two coils may sense a voltage value inside a closed loop by the wire 1200.

Moreover, the sensing unit 140 may include a wheel sensor, and the wheel sensor may sense information about at least one operation history of a main driving wheel and an auxiliary driving wheel included in the driver 130.

The moving robot disclosed herein may combine and use pieces of information sensed by at least two or more of the sensors.

Various sensors included in the sensing unit 140 may perform sensor calibration before the moving robot 100 operates. The calibration denotes setting a parameter associated with an operation of a sensor in order for the sensor to operate in an optimal state. In more detail, the calibration denotes correcting a display value of a sensor in comparison with a standard sensor. A user may periodically perform the calibration, thereby controlling the parameter values.

The output unit 150 is for generating an output associated with sight, hearing, tactus and may include at least one of a display unit, a sound output unit, a vibration module, and a light output unit. The display unit may form a mutual layer structure with a touch sensor or may be provided as one body with the touch sensor, thereby implementing a touch screen. The touch screen functions as a user input unit that provides an input interface between the moving robot 100 and a user and may provide an output interface between the moving robot 100 and the user.

The mowing unit 160 is for mowing lawn, and a rotatable knife blade may be provided in the mowing unit 160. That is, the mowing unit 160 may include a knife blade member 161 for mowing lawn, a rotation shaft for rotating the knife blade member, and a motor member.

Moreover, the memory 170 may store data that supports various functions of the moving robot 100. The memory 170 may store a plurality of application programs or applications executed in the moving robot 100, pieces of data for operating the moving robot 100, and commands. At least some of the application programs may be downloaded from an external server through wireless communication. Also, at least some of the application programs may be provided in the moving robot 100 from a release time, for fundamental functions (for example, a mowing function, a moving function, a charging/discharging function, a communication function, etc.) of the moving robot 100. The application programs may be stored in the memory 170, installed in the moving robot 100, and executed by the controller 180 to perform an operation (or a function) of the moving robot.

The controller 180 may control an overall operation of the moving robot 100, in addition to an operation associated with the application programs. The controller 180 may process input or output signals, data, and information by using the elements, thereby providing or processing information or functions appropriate for the user.

Moreover, the controller 180 may control at least some of the elements described above with reference to FIG. 2, for executing the application programs stored in the memory 170. Furthermore, the controller 180 may combine and operate at least two or more of the elements included in the moving robot 100, for executing the application programs.

The power supply 190 may receive external power and internal power and may supply power to the elements included in the moving robot 100 according to control by the controller 180. The power supply 190 may include a battery, and the battery may be an embedded battery or a replaceable battery.

At least some of the elements may operate through cooperation for implementing an operation, control, or a control method of a mobile terminal according to various embodiments described below. Also, the operation, control, or control method of the mobile terminal may be implemented in the mobile terminal through executing of at least one application program stored in the memory 170.

Hereinafter, detailed elements of a sensing unit of a moving robot or a lawn mowing robot according to an embodiment of the present invention will be described with reference to FIG. 3.

Figure 3:
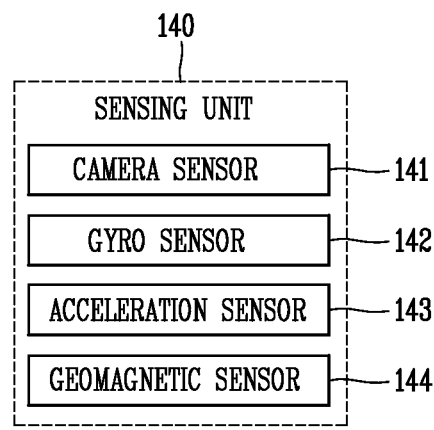
FIG. 3 is a block diagram illustrating detailed elements of a sensing unit of a moving robot or a lawn mowing robot according to an embodiment of the present invention.

As illustrated in FIG. 3, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared sensor, a finger scan sensor, an ultrasonic sensor, an optical sensor (for example, a camera), a microphone, a battery gauge, an environment sensor (for example, a barometer, a hygrometer, a thermometer, a radiation sensor, a heat sensor, a gas sensor, etc.), and a chemical sensor (for example, an electronic nose, a healthcare sensor, a bio recognition sensor, etc.).

Particularly, the sensing unit 140 may include at least one of a geomagnetic sensor, an inertial measurement unit (IMU), and an attitude heading reference system (AHRS).

Before a sensor calibration is performed by the controller 180, a parameter associated with a sensor included in the sensing unit 140 may be set to a default value. That is, before the calibration is performed by the controller 180, sensors included in the sensing unit 140 may be in an initialized state.

Hereinafter, a calibration method of various sensors included in the sensing unit 140 will be described. Particularly, in the present specification, a method of performing, by the moving robot 100 which includes at least one of a geomagnetic sensor, a gyroscope sensor, an acceleration sensor, an IMU, and an AHRS or a lawn mowing robot including the sensors, a calibration on the sensors will be described.

Hereinafter, a method of performing, by a moving robot or a lawn mowing robot according to an embodiment of the present invention, a sensor calibration in an operating area 1000 of a corresponding robot will be described.

Figure 4A:
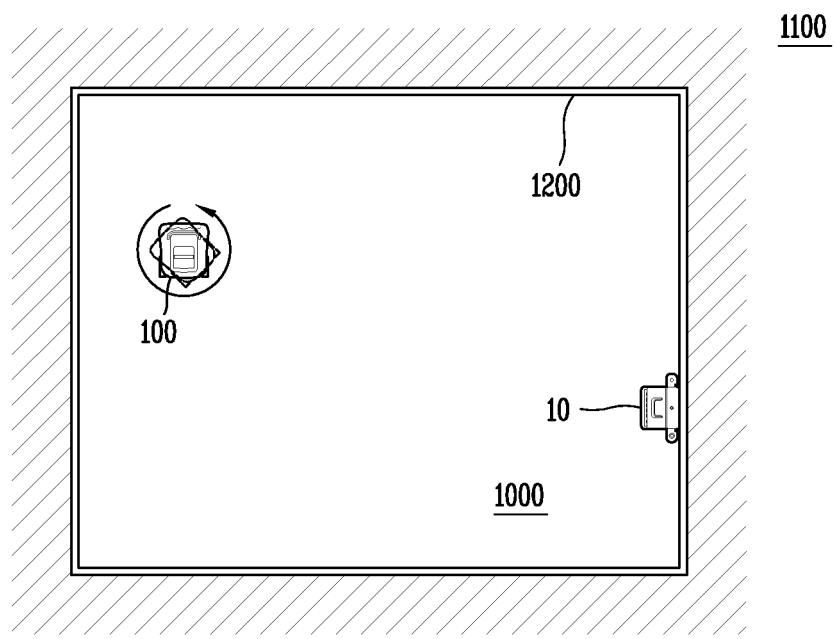
FIGS. 4A to 4C are conceptual diagrams illustrating a method of performing, by a moving robot or a lawn mowing robot according to the present invention, sensor calibration in an operating area of a corresponding robot.

Referring to FIG. 4A, the controller 180 may control a driving wheel in order for one point of the body of the moving robot 100 to orient toward all points. That is, the controller 180 may rotate or move the body in order for one point of the body of the moving robot 180 to orient toward a plurality of points, thereby performing the sensor calibration.

In an embodiment, the controller 180 may control the driving wheel in order for the body of the moving robot 100 to perform an in-place rotation, and may perform the sensor calibration by using information which is obtained from a sensor while the body is rotating in place by 360 degrees or more.

In detail, the moving robot 100 may include a first wheel and a second wheel which are respectively provided on a left side and a right side of the body, and the controller 180 may rotate the first and second wheels in opposite directions, thereby rotating the body of the moving robot 100 in place. That is, the controller 180 may control the first and second wheels to rotate the first and second wheels in opposite directions during a certain time interval, and at this time, may perform the sensor calibration by using information obtained from a sensor.

For example, the controller 180 may rotate the first and second wheels in opposite directions so that the body of the moving robot 100 rotates by 360 degrees or more, and thus, one point of the body orients toward all points.

The controller 180 may control the driving wheel to rotate the body at a plurality of points in an operating area of a corresponding robot, thereby performing the sensor calibration. The body may rotate by 360 degrees or more at one point of an operating area of the moving robot 100, and when the sensor calibration is completed at the one point, the controller 180 may control the driving wheel to move the moving robot 100 to another point of the operating area. When the moving robot 100 moves to the other point, the controller 180 may perform the sensor calibration on the other point by rotating the body by 360 degrees or more at the other point.

The controller 180 may determine at least one point at which the sensor calibration is to be performed, based on topographic information of the operating area.

For example, the controller 180 may detect a region, which is substantially plane, of the operating area by using the topographic information of the operating area. The controller 180 may set at least one point, at which the sensor calibration is to be performed, in the region which is a plane.

As another example, the controller 180 may detect a region, where an angle with respect to the horizontal plane is greater than a reference angle value, of the operating area by using the topographic information of the operating area. The controller 180 may set at least one point of the detected region as a point at which the sensor calibration is to be performed.

Moreover, the controller 180 may determine at least one point, at which the sensor calibration is to be performed, in the operating area of the moving robot 100, based on an installation position of the charging device 10.

For example, the controller 180 may determine a position, at which the charging device 10 is installed, as a point at which the sensor calibration is to be performed. As another example, the controller 180 may determine a plurality of points, which are spaced apart from the charging device 10 by different distances, as a point at which the sensor calibration is to be performed.

Figure 4B:
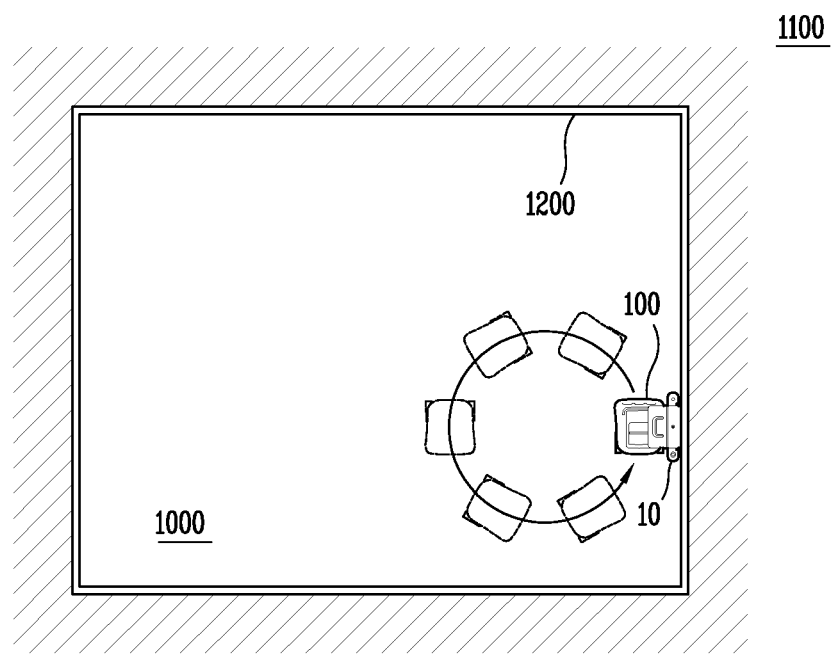

Referring to FIG. 4B, the controller 180 may control the driving wheel in order for the body to move along a circular driving route while one point of the body of the moving robot 100 orients toward a specific point of the operating area 1000.

As illustrated in FIG. 4B, the controller 180 may control the driving wheel to move the body along the circular driving route, thereby performing the sensor calibration. The controller 180 may perform the sensor calibration by using information obtained from a sensor while the body is moving along the circular driving route.

That is, the controller 180 may control the driving wheel in order for the body of the moving robot 100 to move along the circular driving route which is formed with a specific point of the operating area 1000 as a center.

For example, a portion of the circular driving route may be formed to pass through a portion, where the charging device 10 is installed, in the operating area 1000. As another example, the circular driving route may be formed as a closed curve.

Therefore, one point of the body of the moving robot 100 may orient toward a front point while the moving robot 100 is driving along the circular driving route, and thus, the moving robot 100 may obtain information necessary for the sensor calibration.

Figure 4C:
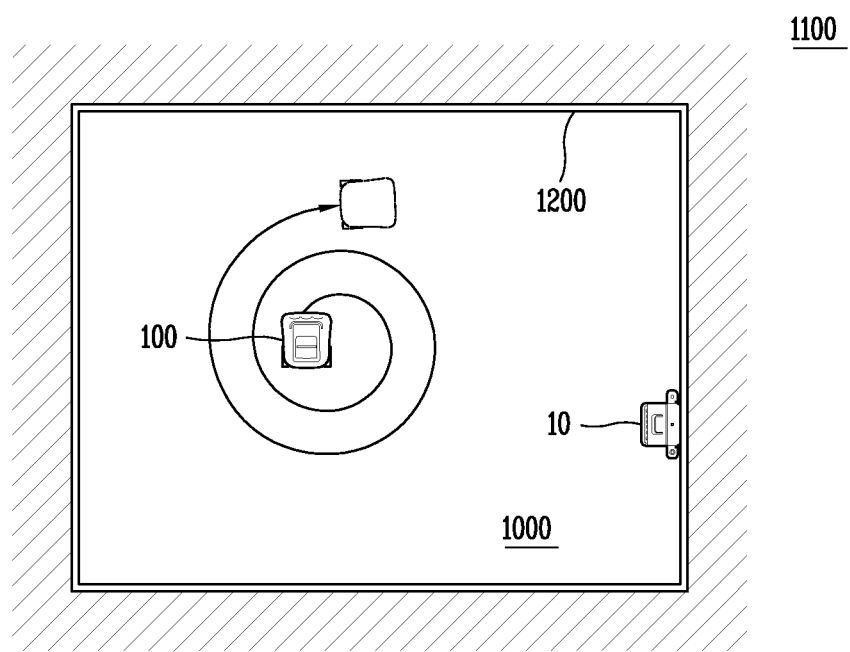

Referring to FIG. 4C, the controller 180 may control the driving wheel in order for the body to move along a spiral driving route, for performing the sensor calibration of the moving robot 100.

The controller 180 may control the driving wheel to move the body along the spiral driving route, thereby performing the sensor calibration. The controller 180 may perform the sensor calibration by using information obtained from a sensor while the body is moving along the spiral driving route.

As described above, the controller 180 may control the driving wheel to move the body of the moving robot 100 according to a predetermined route or pattern, thereby changing a direction, which one point of the body of the moving robot 100 orients toward, by 360 degrees or more.

The controller 180 may control the sensing unit to obtain information for the sensor calibration whenever a direction, which one point of the body orients toward, is changed by a predetermined angle. For example, the predetermined angle may be 0.1 degrees. As another example, one point of the body may be located on a front surface of the moving robot 100.

In the present invention, a method of moving the moving robot 100 for performing the sensor calibration is not limited to the embodiment of FIGS. 4A and 4C, and an arbitrary route or pattern for moving the body may be applied in order for a direction, which one point of the body of the moving robot 100 orients toward, is changed over all points.

Moreover, the controller 180 may move the body of the moving robot 100 according to a moving route or a moving pattern for the sensor calibration, at a plurality of points in the operating area 1000. That is, when the movement for the sensor calibration is completed at one point of the plurality of points in the operating area 1000, the controller 180 may move to a next point, and then, may control the driving wheel to again perform a movement for the second calibration.

Furthermore, the controller 180 may control the driving wheel to move the body according to different moving patterns for each of the plurality of points. The controller 180 may detect information associated with an ambient topography of each of the plurality of points and may move the body according to different moving patterns, based on the ambient topography.

The controller 180 may control the driving wheel in order for the body of the moving robot 100 to move according to the moving patterns illustrated in FIGS. 4A to 4C at a time when the moving robot 100 is initially powered on, a time when the moving robot 180 is powered on in a power-off state, a time when a user input for performing the sensor calibration is applied through the input unit 120, or a time when the communication unit 100 receives an external signal for performing the sensor calibration.

Furthermore, the controller 180 may perform a calibration on the sensing unit 140 by using obtained information while moving in the operating area 1000 move, based on the moving patterns illustrated in FIGS. 4A to 4C.

That is, when the communication unit 110 of the moving robot 100 receives a signal, received from a user terminal (not shown), for performing the sensor calibration, the controller 180 may perform a calibration of a sensor to control the driving wheel to move the body in a predetermined pattern in the operating area of the lawn mowing robot for setting a parameter associated with the sensor.

Hereinafter, a method of performing, by a moving robot or a lawn mowing robot according to an embodiment of the present invention, a calibration will be described with reference to FIGS. 5A and 5B.

Figure 5A:
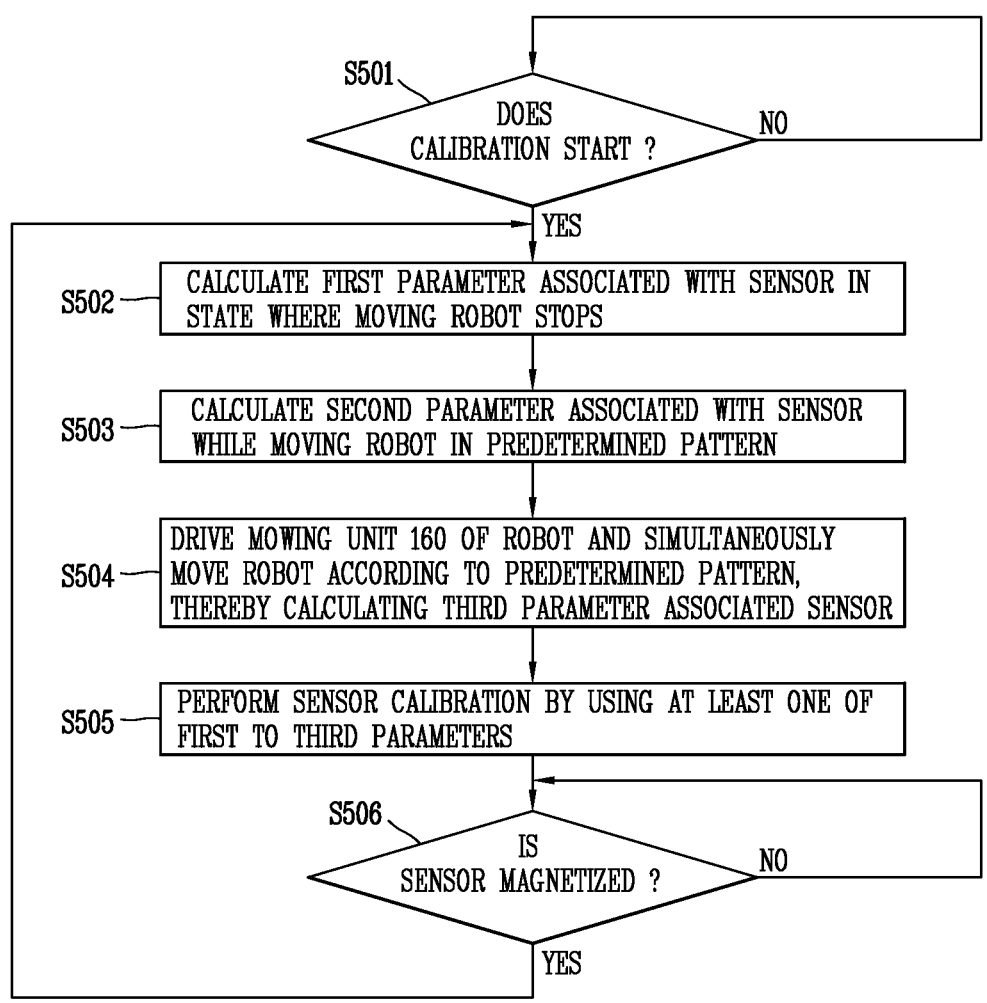
FIGS. 5A and 5B are flowcharts illustrating a method of performing, by a moving robot or a lawn mowing robot according to the present invention, calibration.

As illustrated in FIG. 5A, in operation S501, the controller 180 may determine whether a calibration of the sensing unit 140 is necessary, and may determine whether to start the sensor calibration, based on a result of the determination.

In detail, when it is determined that the moving robot 100 is initially located in the operating area 1000, the controller 180 may control the moving robot 100 in order for the sensor calibration to start.

Moreover, the controller 180 may control the moving robot 100 in order for the sensor calibration to start immediately before the moving robot 100 operates after the moving robot 100 is released.

Moreover, a user of the moving robot 100 may purchase the moving robot 100, and then, when the moving robot 100 is initially powered on, the controller 180 may control the moving robot 100 in order for the sensor calibration to start.

Moreover, when a user input for performing the sensor calibration is received, the controller 180 may control the moving robot 100 in order for the sensor calibration to start.

Subsequently, in operation S502, the controller 180 may calculate a first parameter associated with a sensor in a state where the moving robot 100 stops. In detail, the controller 180 may calculate a parameter associated with a bias of an acceleration sensor in a state where the moving robot 100 stops.

Moreover, in operation S503, the controller 180 may calculate a second parameter associated with the sensor while moving the moving robot 100 in a predetermined pattern.

For example, the controller 180 may calculate a parameter associated with an output level of a geomagnetic sensor while rotating the moving robot 100 counterclockwise. As another example, the controller 180 may calculate a parameter associated with a scale factor of a gyro sensor and a bias and scale factor of a geomagnetic sensor while rotating the moving robot 100 clockwise.

Furthermore, in operation S504, the controller 180 may drive the mowing unit 160 of the moving robot 100 and may simultaneously move the moving robot 100 according to the predetermined pattern, thereby calculating a third parameter associated with the sensor.

That is, the controller 180 may operate the mowing unit 160 while the sensor calibration is being performed.

The controller 180 may calculate the third parameter associated with the sensor calibration while rotating the moving robot 180 by 360 degrees or more in place in the middle of driving a motor of the mowing unit 160 in a certain pattern.

In operation S505, the controller 180 may perform the sensor calibration by using at least one of the first to third parameters.

Even after the calibration is performed, the controller 180 may determine whether the sensor is magnetized at every certain time interval in operation S506. When it is determined that the sensor is magnetized, the sensor calibration may restart.

That is, the controller 180 may determine whether the sensor is magnetized by a magnetic object near the moving robot 100 at every certain time interval. The controller 180 may determine whether to restart the sensor calibration, based on a result of the determination.

Figure 5B:
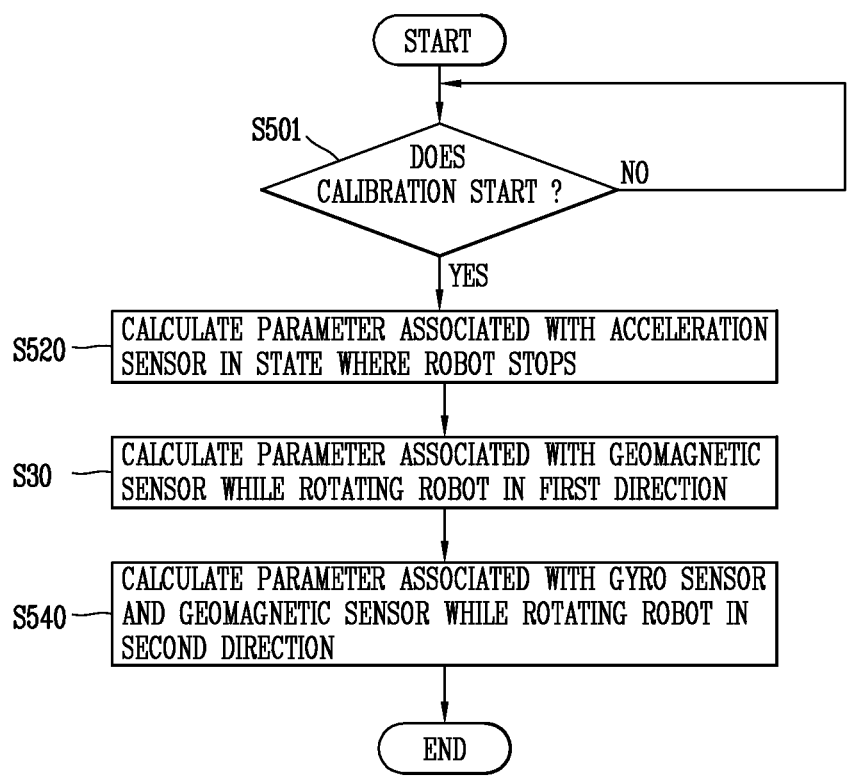

As illustrated in FIG. 5B, the controller 180 may determine whether the calibration of the sensing unit 140 is necessary, and may determine whether to start the sensor calibration, based on a result of the determination in operation S501.

In operation S520, the controller 180 may calculate a parameter associated with an acceleration sensor in a state where the body of the moving robot 100 stops.

In detail, the controller 180 may calculate the first parameter in a state where the body stops, and the first parameter may include a parameter associated with a bias of the acceleration sensor.

When the calculation of the first parameter is completed, the controller 180 may calculate a parameter associated with a geomagnetic sensor while rotating the body of the moving robot 100 in a first direction in operation S530.

In detail, the controller 180 may calculate the second parameter while rotating the body in the first direction (for example, counterclockwise), and the second parameter may include a parameter associated with an output level of the geomagnetic sensor.

When the calculation of the second parameter is completed, the controller 180 may calculate a parameter associated with the gyro sensor and the geomagnetic sensor while rotating the body in a second direction (for example, clockwise) different from the first direction in operation S540.

In detail, the controller 180 may calculate the third parameter while rotating the body in the second direction (for example, clockwise), and the third parameter may include a parameter associated with a bias of the geomagnetic sensor, a scale factor of the geomagnetic sensor, and a scale factor of the gyro sensor.

Figure 6:
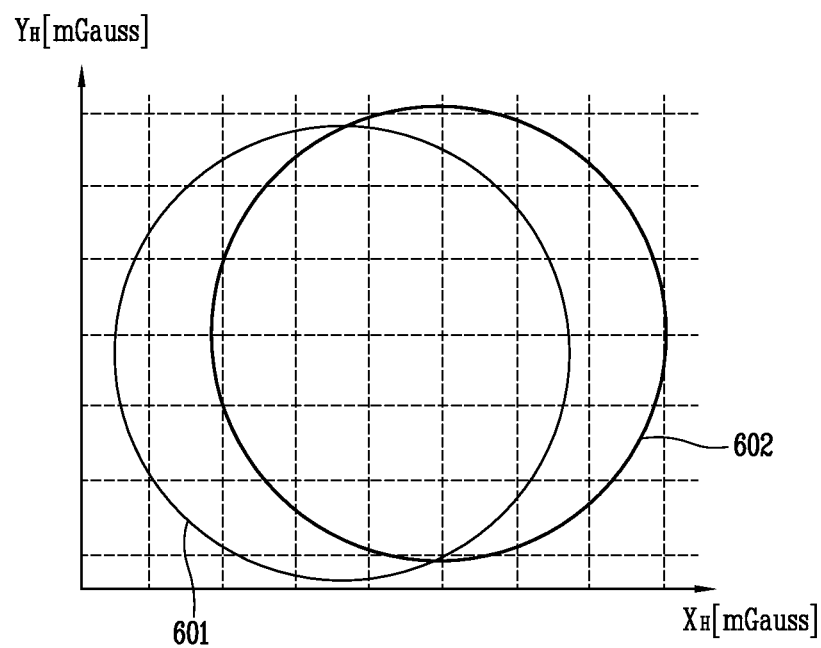
FIG. 6 is a graph showing a parameter value corrected by sensor calibration.

In FIG. 6, a graph showing a parameter value corrected by the sensor calibration is shown.

In the graph of FIG. 6, a before-correction parameter value 601 and an after-correction parameter 602 are shown. The after-correction parameter 602 may correspond to a parameter associated with the scale factor of the geomagnetic sensor. Also, the after-correction parameter 602 may correspond to a parameter associated with the scale factor of the gyro sensor.

The moving robot for performing the sensor calibration according to the present invention can more accurately sense information associated with a driving environment even when the moving robot is driving in a critical region.

Moreover, the moving robot or the lawn mowing robot according to the present invention may perform a sensor calibration in a critical region, thereby reducing an error which occurs in a sensor installed in the moving robot or the lawn mowing robot.

Moreover, the moving robot according to the present invention reduces an error of information sensed in driving in a critical region, and thus, may drive according to an intention of a user. Also, the moving robot according to the present invention can more accurately detect information associated with a current position or route of the body in the critical region.

Moreover, the moving robot according to the present invention may perform a calibration on a sensor installed in the moving robot in an environment where the moving robot operates actually, thereby optimizing a parameter value associated with the sensor.

Moreover, by using an optimized sensor, the moving robot according to the present invention can enhance driving performance even in a critical region.

Moreover, the moving robot according to the present invention may perform a calibration after a sensor is installed in the moving robot, and thus, it is not required to perform a calibration operation in a process of manufacturing the sensor, thereby reducing the manufacturing cost of the sensor.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Therefore, an aspect of the detailed description is to provide a moving robot and a control method thereof, which perform a calibration of a sensor in a critical region, thereby reducing an error of information sensed by the sensor in the middle of operating in an operating area which is the critical region.

Particularly, another aspect of the detailed description is to provide a lawn mowing robot and a control method thereof, which perform self-driving in an area where lawn is planted, accurately sense information associated with an external environment or a posture of the robot, and perform a driving algorithm according to the sensed information.

Moreover, another aspect of the detailed description is to provide a sensor calibration method for enhancing an accuracy of a sensor installed in a moving robot for driving in a critical region. Particularly, another aspect of the detailed description is to provide a moving robot or a lawn mowing robot, which performs a sensor calibration method for enhancing an accuracy of a sensor installed in the moving robot or the lawn mowing robot which drives in an area where lawn is planted.

Moreover, another aspect of the detailed description is to provide a moving robot or a lawn mowing robot, which receives user manipulation for sensor calibration and performs a sensor calibration method according to the received user manipulation.

To achieve these and other advantages and in accordance with the purpose of this specification, as embodied and broadly described herein, a lawn mowing robot for performing self-driving includes a body forming an appearance of the lawn mowing robot, a driving wheel configured to move the body, a sensor configured to sense information associated with a posture of the lawn mowing robot, and a controller configured to perform a calibration of the sensor to control the driving wheel to move the body in a predetermined pattern in an operating area of the lawn mowing robot, for setting a parameter associated with the sensor.

According to an embodiment of the present invention, before the calibration is performed by the controller, the parameter associated with the sensor may be set to a default value.

According to an embodiment of the present invention, the sensor may include at least one of an acceleration sensor, a gyro sensor, and a geomagnetic sensor.

According to an embodiment of the present invention, at least a portion of the operating area may include lawn.

According to an embodiment of the present invention, the operating area may be divided by a predetermined boundary wire.

According to an embodiment of the present invention, the lawn mowing robot may further include a communication unit configured to receive information associated with a boundary from a boundary generation device that generates the information associated with the boundary of the operating area. The controller may control the driving wheel to move the body in a predetermined pattern in the operating area, based on the information associated with the boundary.

According to an embodiment of the present invention, the controller may control the driving wheel for rotating the body so that one point of the body orients toward all points.

According to an embodiment of the present invention, the driving wheel may include a first wheel and a second wheel respectively provided on a left side and a right side of the body, and the controller may rotate the first and second wheels in opposite directions so that the body rotates in place by 360 degrees or more.

According to an embodiment of the present invention, the controller may control the driving wheel so that the body moves along a circular driving route while one point of the body orients toward a specific point in the operating area.

According to an embodiment of the present invention, the controller may control the driving wheel so that the body moves along a spiral driving route.

According to an embodiment of the present invention, the controller may control the driving wheel so that a rotation of the body stops temporarily, and then, the rotation of the body restarts.

According to an embodiment of the present invention, the lawn mowing robot may further include a mowing unit configured to mow the lawn. The controller may operate the mowing unit while the calibration is being performed.

According to an embodiment of the present invention, the mowing unit may include a knife blade member configured to mow the lawn and a motor configured to transfer a driving force to the knife blade member. The controller may operate the motor in a predetermined pattern while the calibration is being performed.

According to an embodiment of the present invention, after the calibration is performed, the controller may determine whether the sensor is magnetized, and when it is determined that the sensor is magnetized, the controller may again perform the calibration of the sensor.

According to an embodiment of the present invention, after an initial calibration is performed by the sensor, the controller may again perform the calibration of the sensor at every predetermined time interval.

According to an embodiment of the present invention, in a state where the body stops, the controller may calculate a first parameter associated with the sensor.

According to an embodiment of the present invention, the controller may calculate a second parameter associated with the sensor while rotating the body in a first direction.

According to an embodiment of the present invention, the controller may calculate a third parameter associated with the sensor while rotating the body in a second direction different from the first direction.

According to an embodiment of the present invention, the controller may perform a sensor calibration by using at least one of the first to third parameters.

According to an embodiment of the present invention, the sensor may include an acceleration sensor, a geomagnetic sensor, and a gyro sensor. The first parameter may be a parameter associated with the acceleration sensor, the second parameter may be a parameter associated with the geomagnetic sensor, and the third parameter may be a parameter associated with the geomagnetic sensor and the gyro sensor.

The moving robot for performing the sensor calibration according to the present invention can more accurately sense information associated with a driving environment even when the moving robot is driving in a critical region.

Moreover, the moving robot or the lawn mowing robot according to the present invention may perform a sensor calibration in a critical region, thereby reducing an error which occurs in a sensor installed in the moving robot or the lawn mowing robot.

Moreover, the moving robot according to the present invention reduces an error of information sensed in driving in a critical region, and thus, may drive according to an intention of a user. Also, the moving robot according to the present invention can more accurately detect information associated with a current position or route of the body in the critical region.

Moreover, the moving robot according to the present invention may perform a calibration on a sensor installed in the moving robot in an environment where the moving robot operates actually, thereby optimizing a parameter value associated with the sensor.

Moreover, by using an optimized sensor, the moving robot according to the present invention can enhance driving performance even in a critical region.

Moreover, the moving robot according to the present invention may perform a calibration after a sensor is installed in the moving robot, and thus, it is not required to perform a calibration operation in a process of manufacturing the sensor, thereby reducing the manufacturing cost of the sensor.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lawn mowing robot comprising:
    a body;
    a driving wheel configured to move the body;
    a sensor configured to sense information associated with the lawn mowing robot; and
    a controller configured to perform a calibration of the sensor and to set a parameter associated with the sensor, wherein the controller to perform the calibration by moving the body of the lawn mowing robot in a predetermined pattern at an operating area,
    wherein the controller is configured to:
        perform the calibration of the sensor in response to at least one of the following:
            (1) when the lawn mowing robot is powered on in a power-off state,
            (2) in response to a user input for performing the sensor calibration is applied through an input unit, and
            (3) in response to a communication device receiving an external signal for performing the sensor calibration,
        control the driving wheel in order for one point of the body of the lawn mowing robot to orient toward all points for performing the sensor calibration of the lawn mowing robot, wherein the controller controls the driving wheel such that at least one of:
            (1) the body of the lawn mowing robot to perform an in-place rotation,
            (2) the body of the lawn mowing robot to move along a circular driving route while the one point of the body of the lawn mowing robot orients toward a specific point of the operating area, and
            (3) the body of the lawn mowing robot to move along a spiral driving route, and
        control the sensor to obtain information for the sensor calibration whenever a direction, which the one point of the body orients toward, is changed by a predetermined angle.

2. The lawn mowing robot of claim 1, wherein prior to the controller to perform the calibration of the sensor, the parameter associated with the sensor is at a default value.

3. The lawn mowing robot of claim 1, wherein the sensor is at least one of an acceleration sensor, a gyro sensor, and a geomagnetic sensor.

4. The lawn mowing robot of claim 1, wherein at least a portion of the operating area includes a lawn.

5. The lawn mowing robot of claim 1, wherein the operating area is defined by a predetermined boundary wire.

6. The lawn mowing robot of claim 1, further comprising:
    the communication device configured to receive, from a boundary generation device, boundary information associated with a boundary of the operating area, the boundary generation device to provide the boundary information associated with the boundary of the operating area,
    wherein the controller to control the driving wheel to move, at the operating area, the body of the lawn mowing robot, in a predetermined pattern, based at least on the received boundary information.

7. The lawn mowing robot of claim 1, wherein the controller to control the driving wheel to rotate the body such that the one point of the body is oriented toward other points of the operating area.

8. The lawn mowing robot of claim 7, wherein
    the driving wheel includes a first wheel on a first side of the body, and a second wheel on a second side of the body, and
    the controller to rotate the first and second wheels in opposite directions such that the body rotates by at least 360 degrees.

9. The lawn mowing robot of claim 7, wherein the controller to control the driving wheel such that the body moves relative to the circular driving route while the one point of the body is oriented toward the specific point of the operating area.

10. The lawn mowing robot of claim 7, wherein the controller to control the driving wheel such that the body moves relative to the spiral driving route.

11. The lawn mowing robot of claim 7, wherein the controller to control the driving wheel such that rotation of the body stops temporarily, and then the rotation of the body restarts.

12. The lawn mowing robot of claim 7, further comprising:
    a mowing device configured to mow a lawn,
    wherein the controller to control the mowing device while the controller is performing the calibration.

13. The lawn mowing robot of claim 12, wherein the mowing device includes:
    a knife blade member configured to mow the lawn; and
    a motor configured to provide a driving force to the knife blade member, and
    wherein the controller to control the motor to have a predetermined pattern while the controller performs the calibration.

14. The lawn mowing robot of claim 1, wherein
    after the controller performs the calibration of the sensor, the controller to determine whether the sensor is magnetized, and when the controller determines that the sensor is magnetized, the controller again performs the calibration of the sensor.

15. The lawn mowing robot of claim 14, wherein after the controller performs an initial calibration of the sensor, the controller again performs the calibration of the sensor at at least one predetermined time interval.

16. The lawn mowing robot of claim 1, wherein when the body stops, the controller to determine a first parameter associated with the sensor.

17. The lawn mowing robot of claim 16, wherein the controller to determine a second parameter associated with the sensor while the body is rotating in a first direction.

18. The lawn mowing robot of claim 17, wherein the controller to determine a third parameter associated with the sensor while the body is rotating in a second direction different from the first direction.

19. The lawn mowing robot of claim 18, wherein the controller to provide a sensor calibration by using at least one of the first to third parameters.

20. The lawn mowing robot of claim 19, wherein
the sensor includes an acceleration sensor, a geomagnetic sensor, and a gyro sensor, and
the first parameter is a parameter associated with the acceleration sensor,
the second parameter is a parameter associated with the geomagnetic sensor, and
the third parameter is a parameter associated with the geomagnetic sensor and the gyro sensor.

21. A moving robot comprising:
a body;
a sensor configured to sense information associated with the moving robot; and
a controller configured to control movement of the body of the moving robot at an operating area, and wherein the controller to set a parameter of the sensor based on the movement of the body,
wherein the controller is configured to:
perform calibration of the sensor in response to at least one of the following:
(1) when the moving robot is powered on in a power-off state,
(2) in response to a user input for performing sensor calibration is applied at an input unit, and
(3) in response to a communication device receiving an external signal for performing the sensor calibration,
control a driving wheel in order for one point of the body of the moving robot to orient toward all points for performing the sensor calibration of the moving robot, wherein the controller controls the driving wheel such that at least one of:
(1) body of the moving robot to perform an in-place rotation,
(2) the body of the moving robot to move along a circular driving route while the one point of the body of the moving robot orients toward a specific point of the operating area, and
(3) the body of the moving robot to move along a spiral driving route, and
control the sensor to obtain information for the sensor calibration whenever a direction, which the one point of the body orients toward, is changed by a predetermined angle.

22. The moving robot of claim 21, wherein the controller to control the moving robot such that the body moves relative to the circular driving route while the one point of the body is oriented toward the specific point of the operating area.

23. The moving robot of claim 21, wherein the controller to control the moving robot such that the body moves relative to the spiral driving route.

24. The moving robot of claim 21, wherein when the body stops movement, the controller to determine a first parameter associated with the sensor.

25. The moving robot of claim 24, wherein the controller to determine a second parameter associated with the sensor while the body is rotating in a first direction.

26. The moving robot of claim 25, wherein the controller to determine a third parameter associated with the sensor while the body is rotating in a second direction different from the first direction.

27. The moving robot of claim 26, wherein the controller to provide a sensor calibration by using at least one of the first to third parameters.

* * * * *